United States Patent
Pandey et al.

(10) Patent No.: US 8,811,189 B2
(45) Date of Patent: Aug. 19, 2014

(54) GENERATING ACCURATE DYNAMIC HEAT MAPS

(75) Inventors: Santosh Pandey, Santa Clara, CA (US); Brian Donald Hart, Sunnyvale, CA (US); Deepak Badri, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 183 days.

(21) Appl. No.: 13/453,642

(22) Filed: Apr. 23, 2012

(65) Prior Publication Data

US 2013/0279349 A1 Oct. 24, 2013

(51) Int. Cl.
*H04L 12/26* (2006.01)
*H04W 16/18* (2009.01)
*H04W 24/00* (2009.01)
*H04W 64/00* (2009.01)

(52) U.S. Cl.
CPC .............. *H04W 16/18* (2013.01); *H04W 24/00* (2013.01); *H04W 64/00* (2013.01)
USPC ........................................ 370/241; 455/67.11

(58) Field of Classification Search
None
See application file for complete search history.

(56) References Cited

U.S. PATENT DOCUMENTS

| 7,904,092 | B2 | 3/2011 | Hart et al. | |
|---|---|---|---|---|
| 2008/0084858 | A1* | 4/2008 | Hart et al. | 370/342 |
| 2008/0085692 | A1* | 4/2008 | Hart et al. | 455/187.1 |

OTHER PUBLICATIONS

Airwave: "VisualRF and VisualRF Plan User Guidee AWMS 7.1".
Bahl et al. "Enhancements to the Tadar User Location and Tracking System" Feb. 2000.

* cited by examiner

*Primary Examiner* — Kevin C Harper
(74) *Attorney, Agent, or Firm* — Tucker Ellis LLP

(57) ABSTRACT

Described in an example embodiment herein is a technique for generating a heat map representative of a radio frequency environment based on data representative of antenna pattern, antenna orientation, access point height and a path loss model. In particular embodiments, the base heat map can be corrected based on neighbor access point (AP) signal strength measurements, such as received signal strength indications (RSSIs) that are added over a base heat map. The neighbor RSSIs may be adjusted to a point underneath the AP.

19 Claims, 3 Drawing Sheets

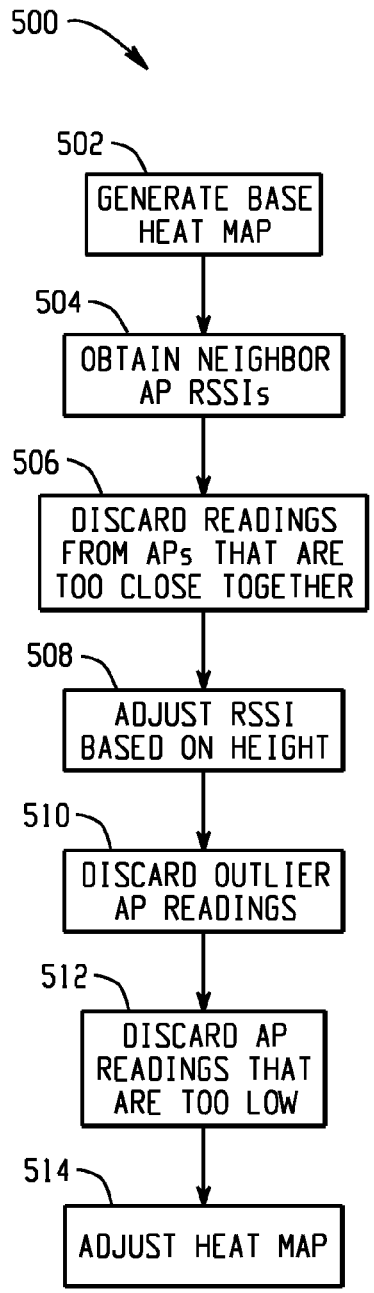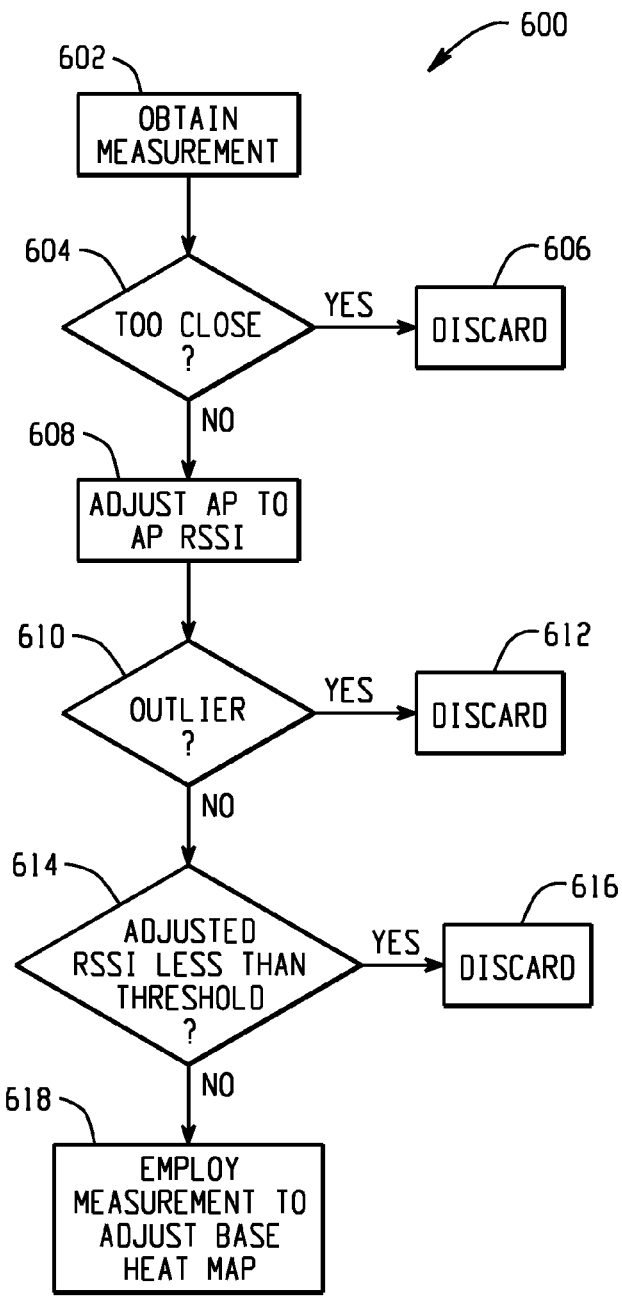
Fig. 5
Fig. 6

GENERATING ACCURATE DYNAMIC HEAT MAPS

CROSS REFERENCE TO RELATED APPLICATIONS

1. Technical Field

The present disclosure relates generally to generating a heat map indicative of a radio frequency (RF) environment.

2. Background

The "Heat map" of an Access Point ("AP") is the estimated Received Signal Strength Indications ("RSSIs") that a client may receive at different locations. Heat maps are useful for network planning. For example, areas where poor RSSI values are observed on the heat map are good candidates for adding APs. Co-channel interference can be estimated by overlapping heat maps of APs on the same channel. Moreover, the ability to precisely determine the location of a wireless client in a network depends on accurate heat maps.

BRIEF DESCRIPTION OF THE DRAWINGS

The accompanying drawings incorporated herein and forming a part of the specification illustrate the example embodiments.

FIG. 5 illustrates a methodology for generating a heat map.

FIG. 6 illustrates a methodology for determining whether to employ a signal strength measurement for generating a heat map.

OVERVIEW OF EXAMPLE EMBODIMENTS

Figure 1:
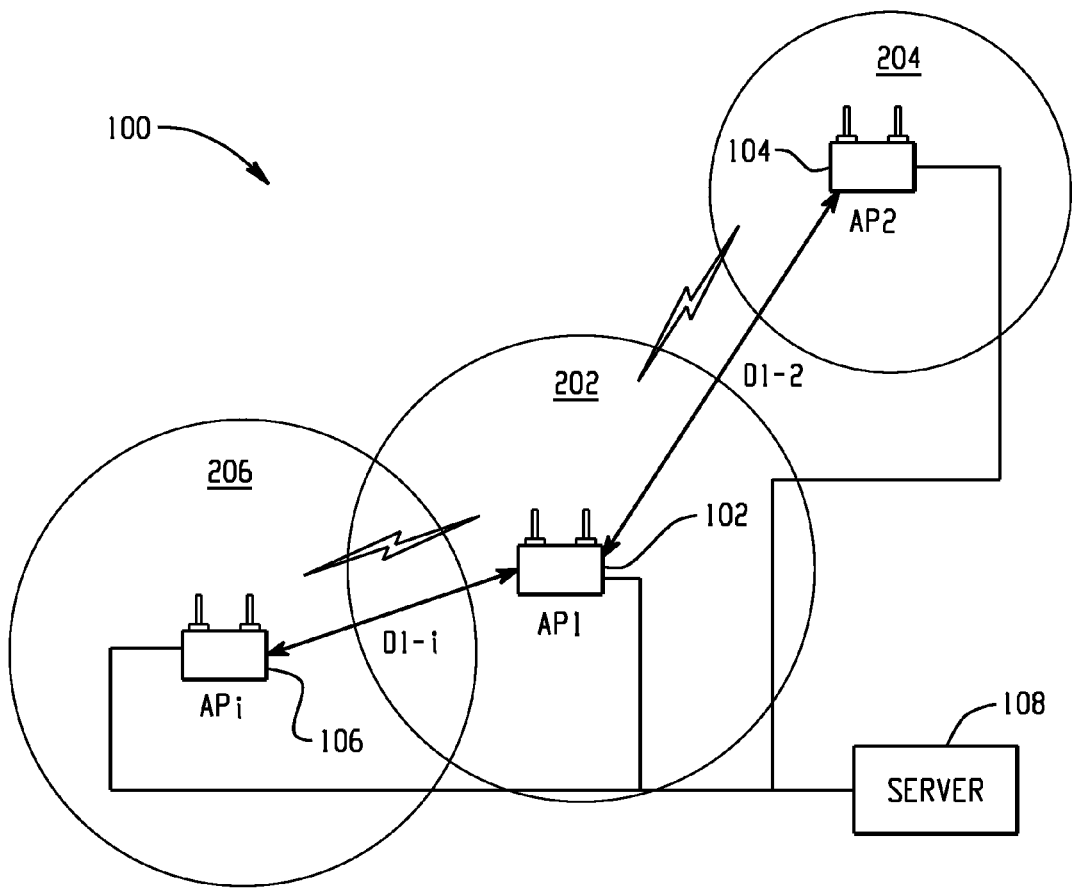
FIG. 1 illustrates an example of a coverage map for a physical area.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

Described in an example embodiment herein is a technique for generating a heat map representative of a radio frequency environment based on data representative of antenna pattern, antenna orientation, access point height and a path loss model. In particular embodiments, the base heat map can be corrected based on neighbor access point (AP) signal strength measurements, such as received signal strength indications (RSSIs) that are added over a base heat map. The neighbor RSSIs may be adjusted to a point underneath the AP.

DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

Described in an example embodiment herein, is a technique for generating a heat map representative of a radio frequency environment based on data representative of antenna pattern, antenna orientation, access point height and a path loss model. In particular embodiments, the base heat map can be corrected based on neighbor access point (AP) signal strength measurements, such as received signal strength indications (RSSIs) that are added over a base heat map.

For example, a base heat map is generated employing antenna pattern, orientation, AP height and path loss model as obtained by calibration. For an access point represented by the heat map, the neighbor AP RSSIs and the RSSIs of the neighbor APs as measured by the access point are obtained. The RSSIs are adjusted to represent an RSSI at a point underneath the APs.

FIG. 1 illustrates an example of a coverage map for a physical area 100. Within physical area 100 are three access points (APs), AP1 102 with a coverage area illustrated by circle 202, AP2 104 with a coverage area illustrated by circle 204, and APi 106 (where i is an integer greater than 2) with a coverage area 206. Those skilled in the art can readily appreciate the number of APs selected for this example was merely for ease of illustration as any physically realizable number of APs may be employed.

AP 102 is a first distance D1-2 from AP 104. AP 102 is a second distance D1-$i$ from AP 106.

In the example illustrated in FIG. 1, a server 108 is coupled with APs 102, 104, 106 and can receive signal strength measurement data from APs 102, 104, 106. As those skilled in the art can readily appreciate, server 108 may be a remote device from APs 102, 104, 106 or may be co-located within one of APs 102, 104, 106.

The server 108 generates a base heat map representative of a radio frequency environment for physical location 100 based on data representative of antenna pattern, antenna orientation, access point height, access point placement, the path loss model, and optionally calibration measurements. In an example embodiment, server 108 receives data representative of antenna pattern, antenna orientation, access point height, and access point placement for APs 102, 104, 106, and a path loss model for physical location 100. Optionally, calibration measurements may be obtained around physical location 100. For example, a user (not shown) may employ a wireless device and walk around various locations and obtain RSSI readings. The data may then be uploaded to server 108 using any suitable technique, such as for example, sending the data wireless via one of APs 102, 104, 106 to server 108, or coupling the wireless device to server 108. Alternatively, a user may employ a user interface for inputting the data into server 108.

In an example embodiment, the server 108 may adjust the base heat map based on neighbor AP RSSI measurements. For example, AP 102 provides server 108 with RSSI measurement data of measurements from signals received from APs 104 and 106 (and any other APs that AP 102 may detect). AP 104 provides server 108 with RSSI measurement data for signals detected from APs 102 and 106. AP 106 provides server 108 with RSSI measurements data for signal received from APs 102 and 104.

In an example embodiment, RSSI measurements made by APs within a predefined proximity to each other may be discarded. For example, if the distance (D1-$i$) between AP 106 to AP 102 is within the predefined proximity, the measurements by AP1 of APi and APi of AP1 are discarded. If, the distance (D1-2) between, AP 102 and AP 104 is greater than the predefined proximity, the measurements made by APs 102 and 106 for each other are retained.

In an example embodiment, RSSI measurements that are less than a predefined value are discarded, or treated as no reading. For example, RSSI measurements less than −85 dB can be discarded.

In particular embodiments, the server 108 adjusts the RSSI readings based on an assumed height of a client underneath the AP, which may be floor level or any height above the floor. For example, a RSSI reading received by AP 106 for AP 102 may be adjusted to a height underneath AP 106. In an example embodiment, the client antenna gain and client transmit power may be different than the APs. For example, to adjust the RSSI received by AP 106 for AP 102 (AP1_TO_APi_RSSI), the adjusted AP1_to_APi_RSSI=measured AP1_to_APi_RSSI:
  −antenna gain of APi (adjusted for azimuth and elevation angle at which AP1 is located with respect to APi)
  +client antenna gain (adjusted for azimuth, elevation angle at which AP1 is located with respect to client)
  −transmit power for APi
  +client transit power
  −AP to AP path loss (adjusted for AP to AP distance)
  +AP to client path loss (adjusted for AP to client distance).
In an example embodiment, RSSI measurements made by AP 102 of signals received from AP 106 (AP_i_to_AP1_RSSI) is also adjusted based on the height of the AP and optionally the transmit power and antenna gain of the AP may be replaced by the transmit power and antenna gain of a client. For example:
  APi_to_AP1_RSSI (APi→AP1)=measured APi_to_AP1_RSSI
  −antenna gain of APi (adjusted for azimuth and elevation angle at which AP1 is located with respect to APi)
  +client's antenna gain (adjusted for the azimuth and elevation angle at which AP1 is located with respect to the client)
  −transmit power for AP1
  +client's transmit power.

In an example embodiment, if the adjusted RSSI's measured by two APs (for example AP 102 and AP 104) of each other are different by more than a predefined amount (e.g., one of the APs is an outlier, such as for example the APs are on different channels and one of the APs is measuring cross channel interference), at least one of the measurements may be discarded. In an example embodiment, an absolute value of the difference is used, for example: if abs(adjusted AP1_to_APi_RSSI−adjusted APi_to_AP1_RSSI)>RSSI_OUTLIER_THRESHOLD; the lower of AP1_to_APi_RSSI and APi_to_AP1_RSSI is dropped.

In an example embodiment, adjusted AP RSSIs below a predefined threshold are discarded. For example, if the adjusted RSSI of AP 104 measured by AP 106 is less than a predefined threshold, such as −85 dB, the adjusted RSSI is discarded.

In an example embodiment, server 108 adjusts the base heat map based on the adjusted RSSI values, at points where the adjusted RSSI values are different than the RSSI values in the base heat map. In particular embodiments, server 108 performs a 2-dimensional linear interpolation to adjust points within the convex hull (coverage area, e.g., within areas 202, 204, and/or 206) of the access points 102, 104, 106. The RSSI data may be extrapolated for areas outside the convex hulls.

In an example embodiment, the server 108 does not adjust an area of the base heat map around a selected access point where the number of neighboring access points detected by the selected access point is less than a predetermined number of neighboring access points. For example, if AP 106 only detects one AP, then the area of the base heat map around AP 106 is not adjusted.

In an example embodiment, the server 108 periodically obtains updated neighboring signal strength data, recalculates the adjusted signal strengths based on the updated neighboring signal strength data and adjusts the base heat map based on the recalculated adjusted signal strengths. The time period may be any suitable or desired time period such as every 15 minutes, hourly, daily, weekly, etc.

In an example embodiment, the server 108 obtains updated neighboring signal strength data in response to a triggering event. For example, if a change in RSSI between neighboring APs greater than a threshold amount is detected, for example, if the AP1_to_APi_RSSI changes by more than 10 dB, the server 108 will obtain updated neighboring signal strength data.

Figure 2:
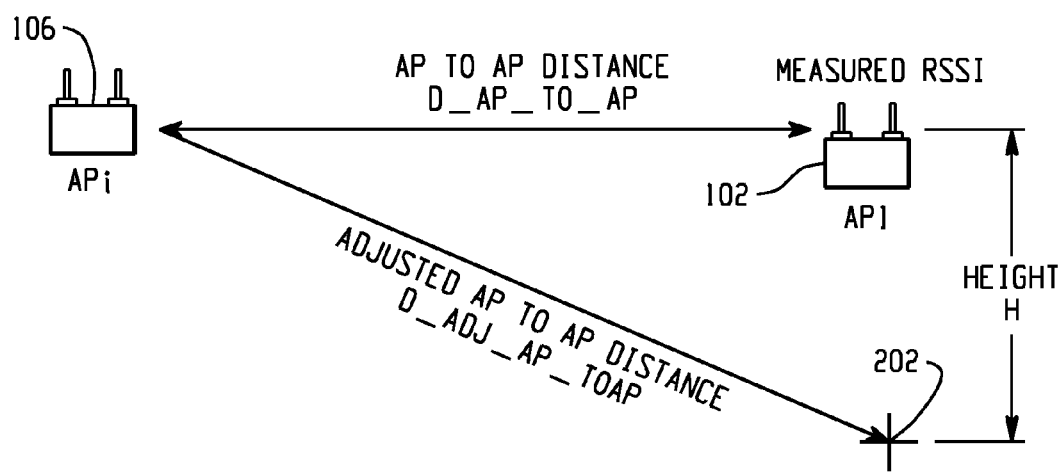
FIG. 2 illustrates an example of adjusting a measured signal strength based on the height of an access point.

FIG. 2 illustrates an example of adjusting a measured signal strength based on the height of an access point. For example, the distance to point 202 underneath AP 102 can be calculated as $SQRT(D\_AP\_TO\_AP^2+H^2)$. The adjusted RSSI can be based on the Adjusted AP to AP distance based on a path loss model between the access points or a path loss model between the access point and the client (which may also be adjusted for the distance between the access point and the client).

Figure 3:
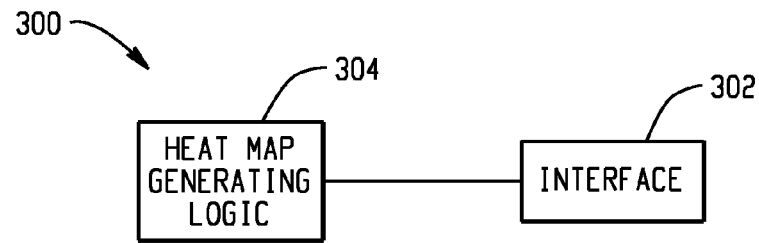
FIG. 3 illustrates an example of an apparatus for generating a heat map.

FIG. 3 illustrates an example of an apparatus 300 for generating a heat map. Apparatus 300 comprises an interface 302 for obtaining data for generating the heat map. Interface 302 may be a user interface that allows a user to input the data, and/or may be a communications interface suitable for receiving data from other devices. The heat map generating logic 304 obtains data for generating the heat map via the interface 302. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit ("ASIC"), system on a chip ("SoC"), programmable system on a chip ("PSOC"), a programmable/programmed logic device, memory device containing instructions, or the like, or combinational logic embodied in hardware. Logic may also be fully embodied as software stored on a non-transitory, tangible medium which performs a described function when executed by a processor. Logic may suitably comprise one or more modules configured to perform one or more functions.

The heat map generating logic 304 generates a base heat map representative of a radio frequency environment for physical location based on data representative of antenna pattern, antenna orientation, access point height, access point placement, the path loss model, and optionally calibration measurements. In an example embodiment, the heat map generating logic 304 receives data representative of antenna pattern, antenna orientation, access point height, and access point placement for the APs and a path loss model for the location. Optionally, calibration measurements may be obtained. For example, a user (not shown) may employ a wireless device and walk around various locations and obtain RSSI readings. The data may then be uploaded to heat map generating logic 304 using any suitable technique, such as for example, sending the data wireless via one of the APs in communication with interface 302, or coupling the wireless device to interface 302. Alternatively, a user may employ a user interface for inputting the data into heat map generating logic 304.

In an example embodiment, the heat map generating logic 304 may adjust the base heat map based on neighbor AP RSSI measurements. APs provide heat map generating logic 304 with RSSI measurement data of measurements from signals received from neighboring APs.

In an example embodiment, RSSI measurements made by APs within a certain proximity to each other may be discarded. For example, measurements from APs that are within five feet of each other may be discarded.

In an example embodiment, RSSI measurements that are less than a predefined value are discarded, or treated as no reading. For example, RSSI measurements less than −85 dB can be discarded.

In particular embodiments, the heat map generating logic 304 adjusts the RSSI readings based on an assumed height of a client underneath the AP, which may be floor level or any height above the floor. For example, a RSSI reading received by a second AP (APi) for a first AP (AP1) may be adjusted to a height underneath APi. In an example embodiment, because the client antenna gain and client transmit power may be different than the APs. For example, to adjust the RSSI received by AP1 for APi (AP1_TO_APi_RSSI):

the adjusted AP1_to_APi_RSSI=measured AP1_to_APi_RSSI
  −antenna gain of APi (adjusted for the azimuth and elevation angle at which AP1 is located with respect to APi)
  +client antenna gain (adjusted for the azimuth and elevation angle at which AP1 is located with respect to the client)
    −transmit power of APi
    +client transit power
  −AP to AP path loss (adjusted for AP to AP distance)
  +AP to client path loss (adjusted for AP to client distance).

In an example embodiment, the RSSI measurement made by AP1 of signals received from APi (AP_i_to_AP1_RSSI) is also adjusted based on the height of the AP and optionally the transmit power and antenna gain of the AP may be replaced by the transmit power and antenna gain of a client.

For example: AP_i_to_AP1_RSSI (AP_i→AP1)=measured AP_i_to_AP1_RSSI
  −antenna gain of APi (adjusted for the azimuth and the elevation angle at which AP1 is located with respect to APi)
  +client's antenna gain (adjusted for the azimuth and the elevation angle at which AP1 is located with respect to the client)
    −transmit power for AP1
    +client's transmit power
  −AP to AP path loss (adjusted for AP to AP distance)
  +AP to client path loss (adjusted for AP to client distance).

In an example embodiment, if the adjusted RSSI's measured by two APs (for example, AP1 and APi) of each other are different by more than a predefined amount (e.g., one of the APs is an outlier, such as for example the APs are on different channels and one of the APs is measuring cross channel interference), at least one of the measurements may be discarded. In an example embodiment, an absolute value of the difference is used, for example: if abs(adjusted AP1_to_APi_RSSI−corrected APi_to_AP1_RSSI)>RSSI_OUTLIER_THRESHOLD; the lower of AP1_to_APi_RSSI and APi_to_AP1_RSSI is dropped.

In an example embodiment, adjusted AP RSSIs below a predefined threshold are discarded. For example, if the adjusted RSSI is less than −85 dB, the adjusted RSSI is discarded.

In an example embodiment, the heat map generating logic 304 adjusts the base heat map based on the adjusted RSSI values, at points where the adjusted RSSI values are different than the RSSI values in the base heat map. In particular embodiments, heat map generating logic 304 performs a 2-dimensional linear interpolation to adjust points within the convex hull of the access points. The RSSI data may be extrapolated for areas outside the convex hulls.

In an example embodiment, the heat map generating logic 304 does not adjust an area of the base heat map around a selected access point where the number of neighboring access points detected by the selected access point is less than a predetermined number of neighboring access points. For example, if an AP only detects one AP, then the area of the base heat map around that AP is not adjusted.

In an example embodiment, the heat map generating logic 304 periodically obtains updated neighboring signal strength data, recalculates the adjusted signal strengths based on the updated neighboring signal strength data and adjusts the base heat map based on the recalculated adjusted signal strengths. The time period may be any suitable or desired time period such as every 15 minutes, hourly, daily, weekly, etc.

Figure 4:
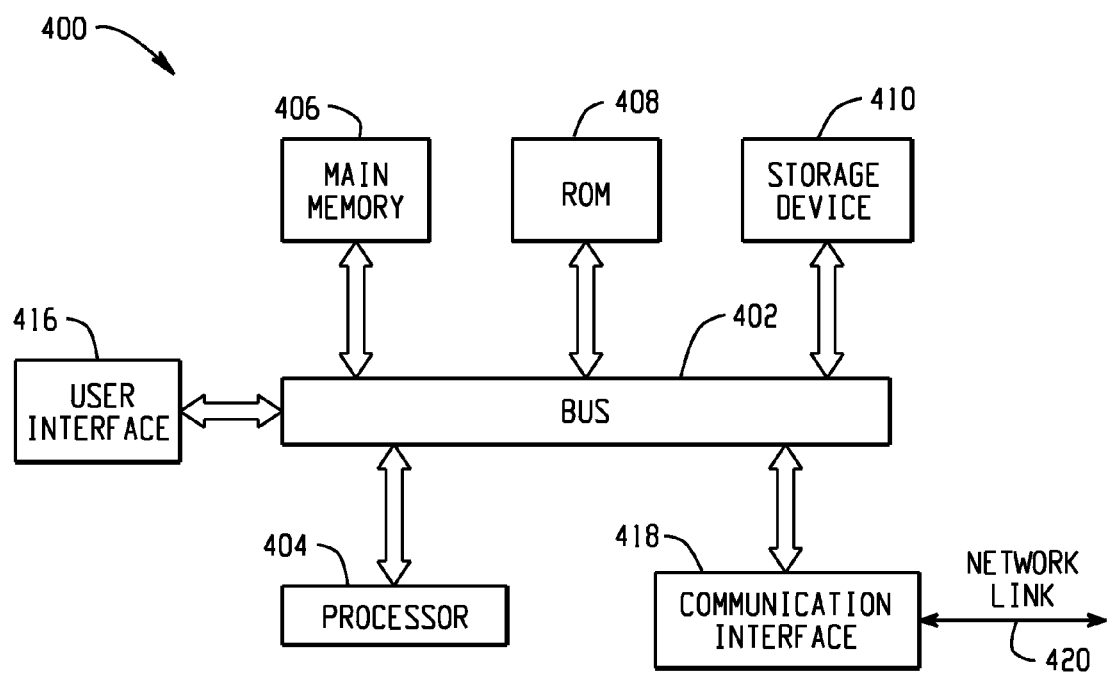
FIG. 4 illustrates an example of a computer system upon which an example embodiment can be implemented.

FIG. 4 illustrates an example of a computer system 400 upon which an example embodiment can be implemented. Computer system 400 may be employed for implementing the functionality of server 108 (FIG. 1) and/or heat map generating logic 304 (FIG. 3).

Computer system 400 includes a bus 402 or other communication mechanism for communicating information and a processor 404 coupled with bus 402 for processing information. Computer system 400 also includes a main memory 406, such as random access memory (RAM) or other dynamic storage device coupled to bus 402 for storing information and instructions to be executed by processor 404. Main memory 406 also may be used for storing a temporary variable or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk, optical disk, and/or flash storage, is provided and coupled to bus 402 for storing information and instructions.

The computer system 400 may be coupled via bus 402 to a user interface 416. The user interface 416 may include a display such as a cathode ray tube (CRT) or liquid crystal display (LCD), for displaying information to a computer user. The user interface 416 may also include an input device, such as a keyboard including alphanumeric and other keys for communicating information and command selections to processor 404. The user interface 416 may employ another type of user input device such as cursor control, e.g., a mouse, a trackball, cursor direction keys, and/or a touchscreen for communicating direction information and command selections to processor 404.

An aspect of the example embodiment is related to the use of computer system 400 for generating accurate dynamic heat maps. According to an example embodiment, generating heat maps is provided by the computer system 400 in response to processor 404 executing one or more sequences of one or more instructions contained in main memory 406. Such instructions may be read into main memory 406 from another computer-readable medium, such as storage device 410. Execution of the sequence of instructions contained in the main memory 406 causes the processor 404 to perform the process steps described herein. One or more processors in a multi-processing arrangement may also be employed to execute the sequences of instructions contained in the main memory 406. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to the processor 404 for execution. Such a medium may take many forms, including but not limited to non-volatile media, and volatile media. Non-volatile media include, for example, optical or magnetic disks, such as the storage device 410. Volatile media include dynamic memory such as main memory 406. As used herein, tangible media may include volatile and non-volatile media. Common forms of computer-readable media include, for example, floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

The computer system 400 also includes a communication interface 418 coupled to bus 402. The communication interface 418 provides a two-way data communication coupling the computer system 400 to a network link 420 connected to a network. In an example embodiment, computer system 400 obtains data representative of neighboring access point signal strength data from access points on a network via the network link 420 coupled with the communication interface 418.

The communication interface may employ suitable device. For example, the communication interface 418 may be a local area network (LAN) card to provide a data communication connection to a compatible LAN. As another example, the communication interface 418 may be an integrated services digital network (ISDN) card or a modem to provide a data communication connection to a corresponding type of telephone line. Wireless links may also be implemented. In any such implementation, communication interface 418 sends and receives electrical, electromagnetic, or optical signals that carry digital data streams representing various types of information.

In view of the foregoing structural and functional features described above, methodologies in accordance with example embodiments will be better appreciated with reference to FIGS. 5 and 6. While, for purposes of simplicity of explanation, the methodologies of FIGS. 5 and 6 are shown and described as executing serially, it is to be understood and appreciated that the example embodiments are not limited by the illustrated orders, as some aspects could occur in different orders and/or concurrently with other aspects from that shown and described herein. Moreover, not all illustrated features may be required to implement the methodologies. The methodologies described herein are suitably adapted to be implemented in hardware, software, or a combination thereof.

FIG. 5 illustrates a methodology 500 for generating a heat map for a radio frequency (RF) environment. The methodology 500 may be implemented by server 108 (FIG. 1), heat map generating logic 304 (FIG. 3), and/or computer system 400 (FIG. 4).

At 502, a base heat map is generated. The base heat map is generated by considering antenna pattern, orientation, AP height and a path loss mode. In an example embodiment, the path loss model may be obtained by calibration.

At 504, neighbor AP signal strength measurements are obtained. In an example embodiment, the signal strength measurements are RSSI measurements.

At 506, measurements from AP neighboring APs that are too close together, e.g., within a predetermined proximity, are discarded. In particular embodiments, measurements that are below a predefined threshold value may be effectively zeroed out, e.g., set at a value indicating that no measurement was received.

At 508, the RSSI values are adjusted based on the height of the APs. In particular embodiments, antenna gain and/or transmit power for the APs may be replaced an assumed antenna gain and/or transmit power for a client. Both measurements for neighboring APs are adjusted, for example, for two neighboring APs, APi and APj, where i and j are integers greater than zero and i does not equal j, The RSSI of APj as measured by APi is adjusted to a RSSI that would be observed by a client below APi, and the RSSI of APi as measured by APj is adjusted to a RSSI that would be observed by a client below APj. An example algorithm for adjusting the RSSI of APj that would be received by a client underneath APi (APj_to_APi_RSSI) is:

adjusted APj_to_APi_RSSI=measured APj_to_APi_RSSI
−gain of APi (adjusted for azimuth and elevation angle at which APj is located with respect to APi)
+client gain (adjusted for azimuth and elevation angle at which APj is located with respect to the client)
−transmit power of APi
+transmit power of client
−AP to AP path loss (adjusted for AP to AP distance)
+AP to client path loss (adjusted for AP to client distance).

The adjusted RSSI of APi that would be received by a client underneath APj (APi_to_APj_RSSI) is:

AP_i_to_APj_RSSI=measured APi_to_APj_RSSI
−antenna gain of APi (adjusted for the azimuth and elevation angle at which APj is located with respect to APi)
+client antenna gain (adjusted for azimuth and elevation angle at which APj is located)
−transmit power of APj
+client transmit power
−AP to AP path loss (adjusted for AP to AP distance)
+AP to client path loss (adjusted for AP to client distance).

At 510, outlier AP readings (where there is a deviation between neighboring AP RSSI values suggesting an error in measurement) are discarded. For example, if the absolute value of the adjusted APj_to_APi_RSSI−adjusted APi_to_APj_RSSI is greater than an outlier threshold (RSSI_OUTLIER_THRESHOLD), then the lower of APj_to_APi_RSSI and APi_to_APj_RSSI is dropped.

At 512, neighboring RSSI values below a predetermined threshold value are ignored. For example, adjusted RSSI values below −85 dB may be discarded. Neighboring RSSI values above the predetermined threshold value are retained.

At 514, the base heat map is adjusted based on the adjusted, neighbor AP readings. The adjusted RSSI is compared with the RSSI of the base heat map at a corresponding location in the base heat map. A 2-dimensional linear interpolation may be performed using points where the adjusted RSSI is different from the RSSI of the base heat map to find the correction at other points within the convex hull of the access points. Adjustments for areas outside the convex hull may be extrapolated. The corrections are then added to the base heat map.

FIG. 6 illustrates a methodology 600 for determining whether to employ a signal strength measurement for generating a heat map. The methodology 500 may be implemented by server 108 (FIG. 1), heat map generating logic 304 (FIG. 3), and/or computer system 400 (FIG. 4).

At 602, neighbor AP signal strength measurements are obtained. In an example embodiment, the signal strength measurements are RSSI measurements.

At 604, a determination is made whether the AP obtaining the measurement is too close together, e.g., within a predetermined proximity to the AP being measured. If the APs are too close (YES), the measurements are discarded at 606. In particular embodiments, measurements that are below a predefined threshold value are also discarded.

If, at 604, the neighboring AP is not too close and/or the RSSI is above a threshold value (NO), at 608, the neighboring AP RSSI measurement is adjusted to a point underneath the AP. In particular embodiments, antenna gain and/or transmit power for the AP may be replaced by an assumed antenna gain and/or transmit power for a client. For example, for a measurement made of APj by APi, where i and j are integers greater than zero and i does not equal j, the RSSI of APj as measured by APi is adjusted to a RSSI that would be observed by a client below APi. An example algorithm for adjusting the RSSI of APj that would be received by a client underneath APi (APj_to_APi_RSSI) is:

adjusted APj_to_APi_RSSI=measured APj_to_APi_RSSI
    −gain of APi (adjusted for azimuth and elevation angle at which APj is located with respect to APi)
    +client gain (adjusted for azimuth and elevation angle at which APj is located with respect to the client)
    −transmit power of APi
    +transmit power of client
    −AP to AP path loss (adjusted for AP to AP distance)
    +AP to client path loss (adjusted for AP to client distance).

At 610, a determination is made whether the measurement of APi by APj or the measurement of APj by APi is an outlier. In order to make this determination, the RSSI of APi as measured by APj is adjusted to a RSSI that would be observed by a client below APj. The adjusted RSSI of APi that would be received by a client underneath APj (APi_to_APj_RSSI) is:

AP_i_to_APj_RSSI=measured APi_to_APj_RSSI
    −antenna gain of APi (adjusted for the azimuth and elevation angle at which APj is located with respect to APi)
    +client antenna gain (adjusted for azimuth and elevation angle at which APj is located)
    −transmit power of APj
    +client transmit power
    −AP to AP path loss (adjusted for AP to AP distance)
    +AP to client path loss (adjusted for AP to client distance).

If, at 610, APi_to_APj_RSSI differs from APj_to_APi_RSSI, for example if the absolute value of the adjusted APj_to_APi_RSSI−minus APi_to_APj_RSSI is greater than an outlier threshold (RSSI_OUTLIER_THRESHOLD), (YES), then the lower of APj_to_APi_RSSI and APi_to_APj_RSSI is dropped at 612. In particular embodiments, both RSSI values may be dropped at 612.

If, at 610, the APi_to_APj_RSSI does not differ from APj_to_APi_RSSI by more than the outlier threshold (NO), at 514, the adjusted RSSI is compared to a predetermined threshold value. If the adjusted RSSI is below the predetermined threshold value (YES), at 616, the measurement is discarded. If, however, at 614, the adjusted RSSI value is above the predetermined threshold (NO), at 618, the measurement is employed to adjust the base heat map.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. An apparatus comprising:
    a processor;
    an interface; and
    heat map logic operable to receive data representative of antenna pattern, antenna orientation, access point height, access point placement for a plurality of access points at a location, and a path loss model for the location;
    wherein the heat map logic is operable to generate a base heat map representative of a radio frequency environment for the location based on the data representative of antenna pattern, antenna orientation, access point height, access point placement, and the path loss model;
    wherein the heat map logic is further operable to obtain data representative of signal strengths of neighboring access points via the interface;
    wherein the heat map logic is further operable to adjust the signal strength measurements based on a height of an access point obtaining a signal strength measurement;
    wherein the heat map logic is further operable to adjust the base heat map based on the adjusted signal strength measurements; and
    wherein the heat map logic is further operable to adjust the base heat map by discarding at least one signal strength measurement or adjusted signal strength measurement.

2. The apparatus according to claim 1, wherein the heat map logic discards signal strength measurements made by neighboring access points within a predefined proximity of each other.

3. The apparatus according to claim 1, wherein the heap map logic discards at least one signal strength measurement between two neighboring access points responsive to the measurements being different by more than a predefined amount.

4. The apparatus according to claim 1, wherein the heat map logic discards an adjusted signal strength measurement responsive to the adjusted signal strength measurement being below a predefined threshold.

5. The apparatus according to claim 1, wherein the height is a distance above a floor.

6. The apparatus according to claim 1, wherein the signal strength measurement employed by the heat map logic is a received signal strength indication.

7. The apparatus according to claim 1, wherein the heat map logic adjusts the base heat map based on two dimensional linear interpolation within a coverage area of the neighboring access points.

8. The apparatus according to claim 7, wherein the heat map logic extrapolates the adjusted signal strength measurements for updating the base heat map outside of the coverage area of the neighboring access points.

9. The apparatus according to claim 1, wherein the heat map logic adjusts the signal strength measurement based on replacing an antenna gain of an access point with an assumed antenna gain of a client.

10. The apparatus according to claim 1, wherein the heap map logic adjusts the signal strength measurement based on replacing a transmit power of an access point with an assumed transmit power of a client.

11. The apparatus according to claim 1, wherein the heat map logic does not adjust an area of the base heat map around a selected access where a number of neighboring access points detected by the selected access point is less than a predetermined number of neighboring access points.

12. The apparatus according to claim 1, wherein the heat map logic periodically obtains updated neighboring signal strength data, recalculates the adjusted signal strengths based on the updated neighboring signal strength data and adjusts the base heat map based on the recalculated adjusted signal strengths.

13. A non-transitory computer readable medium storing logic selectively executed by a processor, and when executed operable to:
receive data representative of antenna pattern, antenna orientation, access point height, access point placement for a plurality of access points at a location, and a path loss model for the location;
generate a base heat map representative of a radio frequency environment for the location based on the data representative of antenna pattern, antenna orientation, access point height, access point placement, and a path loss model;
obtain data representative of signal strengths of neighboring access points;
adjust the signal strength measurements based on a height of an access point obtaining a signal strength measurement;
adjust the base heat map based on the adjusted signal strength measurements; and
adjust the base heat map by discarding at least one signal strength measurement or adjusted signal strength measurement.

14. The non-transitory computer readable medium set forth in claim 13, further operable to discard signal strength measurements made by neighboring access points within a predefined proximity of each other.

15. The non-transitory computer readable medium set forth in claim 13, further operable to discard at least one signal strength measurement between two neighboring access points responsive to the measurements being different by more than a predefined amount.

16. The non-transitory computer readable medium set forth in claim 13, further operable to discard an adjusted signal strength measurement responsive to the adjusted signal strength measurement being below a predefined threshold.

17. A method, comprising:
receiving data representative of antenna pattern, antenna orientation, access point height, access point placement for a plurality of access points at a location, and a path loss model for the location;
generating a base heat map representative of a radio frequency environment for the location based on the data representative of antenna pattern, antenna orientation, access point height, access point placement, and a path loss model;
obtaining data representative of signal strengths of neighboring access points;
adjusting the signal strength measurements based on a height of an access point obtaining a signal strength measurement;
adjusting the base heat map based on the adjusted signal strength measurements;
replacing an antenna gain of an access point with an assumed antenna gain of a client; and
replacing a transmit power of an access point with an assumed transmit power of a client.

18. An apparatus comprising:
a processor;
an interface; and
heat map logic operable to receive data representative of antenna pattern, antenna orientation, access point height, access point placement for a plurality of access points at a location, and a path loss model for the location;
wherein the heat map logic is operable to generate a base heat map representative of a radio frequency environment for the location based on the data representative of antenna pattern, antenna orientation, access point height, access point placement, and the path loss model
wherein the heat map logic is further operable to obtain data representative of signal strengths of neighboring access points via the interface;
wherein the heat map logic is further operable to adjust the signal strength measurements based on a height of an access point obtaining a signal strength measurement;
wherein the heat map logic is further operable to adjust the base heat map based on the adjusted signal strength measurements; and
wherein the heat map logic adjusts the signal strength measurement based on at least one of: i) replacing an antenna gain of an access point with an assumed antenna gain of a client or ii) replacing a transmit power of an access point with an assumed transmit power of a client.

19. An apparatus comprising:
a processor;
an interface; and
heat map logic operable to receive data representative of antenna pattern, antenna orientation, access point height, access point placement for a plurality of access points at a location, and a path loss model for the location;
wherein the heat map logic is operable to generate a base heat map representative of a radio frequency environment for the location based on the data representative of antenna pattern, antenna orientation, access point height, access point placement, and the path loss model
wherein the heat map logic is further operable to obtain data representative of signal strengths of neighboring access points via the interface;
wherein the heat map logic is further operable to adjust the signal strength measurements based on a height of an access point obtaining a signal strength measurement;
wherein the heat map logic is further operable to adjust the base heat map based on the adjusted signal strength measurements; and
wherein the heat map logic does not adjust an area of the base heat map around a selected access where a number of neighboring access points detected by the selected access point is less than a predetermined number of neighboring access points.

* * * * *